(12) United States Patent
Wang et al.

(10) Patent No.: US 11,895,639 B2
(45) Date of Patent: Feb. 6, 2024

(54) GROUP-BASED DISCONTINUOUS RECEPTION ALIGNMENT

(71) Applicant: QUALCOMM Incorporated, San Diego, CA (US)

(72) Inventors: Kaidong Wang, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 160 days.

(21) Appl. No.: 17/651,725

(22) Filed: Feb. 18, 2022

(65) Prior Publication Data

US 2023/0269721 A1 Aug. 24, 2023

(51) Int. Cl.
*H04W 72/12* (2023.01)
*H04W 76/28* (2018.01)
*H04W 72/121* (2023.01)
*H04W 72/20* (2023.01)

(52) U.S. Cl.
CPC ......... *H04W 72/121* (2013.01); *H04W 72/20* (2023.01); *H04W 76/28* (2018.02)

(58) Field of Classification Search
CPC .... H04W 72/121; H04W 76/28; H04W 72/20

USPC .......................................... 370/311
See application file for complete search history.

(56) References Cited

U.S. PATENT DOCUMENTS

| | | | |
|---|---|---|---|
| 2022/0191794 A1* | 6/2022 | Pan ................. | H04W 28/24 |
| 2023/0064488 A1* | 3/2023 | Han ................. | H04W 76/28 |
| 2023/0239793 A1* | 7/2023 | Lin .................. | H04W 52/0216 370/311 |

\* cited by examiner

*Primary Examiner* — Gbemileke J Onamuti
(74) *Attorney, Agent, or Firm* — Harrity & Harrity LLP/Qualcomm Incorporated

(57) ABSTRACT

Various aspects of the present disclosure generally relate to wireless communication. In some aspects, a first network node may receive discontinuous reception (DRX) group information associated with a DRX grouping configuration that enables alignment of access link DRX configurations corresponding to a first set of network nodes and sidelink DRX configurations corresponding to the first set of network nodes, wherein the DRX group information indicates a first group identifier (ID) corresponding to a first DRX group of a plurality of DRX groups associated with the DRX grouping configuration, and wherein the first DRX group includes a first subset of the first set of network nodes. The first network node may communicate, based at least in part on the DRX group information, via at least one of a sidelink or an access link. Numerous other aspects are described.

30 Claims, 9 Drawing Sheets

GROUP-BASED DISCONTINUOUS RECEPTION ALIGNMENT

FIELD OF THE DISCLOSURE

Aspects of the present disclosure generally relate to wireless communication and to techniques and apparatuses for group-based discontinuous reception alignment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first network node. The method may include receiving discontinuous reception (DRX) group information associated with a DRX grouping configuration that enables alignment of access link DRX configurations corresponding to a first set of network nodes and sidelink DRX configurations corresponding to the first set of network nodes, wherein the DRX group information indicates a first group identifier (ID) corresponding to a first DRX group of a plurality of DRX groups associated with the DRX grouping configuration, wherein the first DRX group includes a first subset of the first set of network nodes. The method may include communicating, based at least in part on the DRX group information, via at least one of a sidelink or an access link.

Some aspects described herein relate to a method of wireless communication performed by a first network node of a first set of network nodes. The method may include receiving an indication of a DRX grouping configuration that enables alignment of access link DRX configurations corresponding to a second set of network nodes and sidelink DRX configurations corresponding to the second set of network nodes. The method may include transmitting, to a second network node of the second set of network nodes, DRX group information associated with the DRX grouping configuration, wherein the DRX group information indicates a first group ID corresponding to a first DRX group of a plurality of DRX groups associated with the DRX grouping configuration, wherein the first DRX group includes a first subset of the second set of network nodes.

Some aspects described herein relate to a method of wireless communication performed by a first network node. The method may include receiving, from a second network node, of a first set of network nodes, group assistance information associated with a second set of network nodes, wherein each network node of the second set of network nodes is in a connected state with respect to the second network node. The method may include transmitting an indication of a DRX grouping configuration enabling alignment of access link DRX configurations corresponding to the second set of network nodes and sidelink DRX configurations corresponding to the second set of network nodes.

Some aspects described herein relate to a first network node for wireless communication. The first network node may include a memory and one or more processors coupled to the memory. The one or more processors may be configured to receive DRX group information associated with a DRX grouping configuration that enables alignment of access link DRX configurations corresponding to a first set of network nodes and sidelink DRX configurations corresponding to the first set of network nodes, wherein the DRX group information indicates a first group ID corresponding to a first DRX group of a plurality of DRX groups associated with the DRX grouping configuration, wherein the first DRX group includes a first subset of the first set of network nodes. The one or more processors may be configured to communicate, based at least in part on the DRX group information, via at least one of a sidelink or an access link.

Some aspects described herein relate to a first network node for wireless communication. The first network node may include a memory and one or more processors coupled to the memory. The one or more processors may be configured to receive an indication of a DRX grouping configuration that enables alignment of access link DRX configurations corresponding to a second set of network nodes and sidelink DRX configurations corresponding to the second set of network nodes. The one or more processors may be configured to transmit, to a second network node of the second set of network nodes, DRX group information associated with the DRX grouping configuration, wherein the DRX group information indicates a first group ID corresponding to a first DRX group of a plurality of DRX groups associated with the DRX grouping configuration, wherein the first DRX group includes a first subset of the second set of network nodes.

Some aspects described herein relate to a first network node for wireless communication. The first network node may include a memory and one or more processors coupled to the memory. The one or more processors may be configured to receive, from a second network node, of a first set of network nodes, group assistance information associated with a second set of network nodes, wherein each network node of the second set of network nodes is in a connected state with respect to the second network node. The one or more processors may be configured to transmit an indication of a DRX grouping configuration enabling alignment of access link DRX configurations corresponding to the second set of network nodes and sidelink DRX configurations corresponding to the second set of network nodes.

Some aspects described herein relate to a non-transitory computer-readable medium that stores a set of instructions for wireless communication by a first network node. The set of instructions, when executed by one or more processors of the first network node, may cause the first network node to receive DRX group information associated with a DRX grouping configuration that enables alignment of access link DRX configurations corresponding to a first set of network nodes and sidelink DRX configurations corresponding to the first set of network nodes, wherein the DRX group information indicates a first group ID corresponding to a first DRX group of a plurality of DRX groups associated with the DRX grouping configuration, wherein the first DRX group includes a first subset of the first set of network nodes. The set of instructions, when executed by one or more processors of the first network node, may cause the first network node to communicate, based at least in part on the DRX group information, via at least one of a sidelink or an access link.

Some aspects described herein relate to a non-transitory computer-readable medium that stores a set of instructions for wireless communication by a first network node. The set of instructions, when executed by one or more processors of the first network node, may cause the first network node to receive an indication of a DRX grouping configuration that enables alignment of access link DRX configurations corresponding to a second set of network nodes and sidelink DRX configurations corresponding to the second set of network nodes. The set of instructions, when executed by one or more processors of the first network node, may cause the first network node to transmit, to a second network node of the second set of network nodes, DRX group information associated with the DRX grouping configuration, wherein the DRX group information indicates a first group ID corresponding to a first DRX group of a plurality of DRX groups associated with the DRX grouping configuration, wherein the first DRX group includes a first subset of the second set of network nodes.

Some aspects described herein relate to a non-transitory computer-readable medium that stores a set of instructions for wireless communication by a first network node. The set of instructions, when executed by one or more processors of the first network node, may cause the first network node to receive, from a second network node, of a first set of network nodes, group assistance information associated with a second set of network nodes, wherein each network node of the second set of network nodes is in a connected state with respect to the second network node. The set of instructions, when executed by one or more processors of the first network node, may cause the first network node to transmit an indication of a DRX grouping configuration enabling alignment of access link DRX configurations corresponding to the second set of network nodes and sidelink DRX configurations corresponding to the second set of network nodes.

Some aspects described herein relate to an apparatus for wireless communication. The apparatus may include means for receiving DRX group information associated with a DRX grouping configuration that enables alignment of access link DRX configurations corresponding to a first set of network nodes and sidelink DRX configurations corresponding to the first set of network nodes, wherein the DRX group information indicates a first group ID corresponding to a first DRX group of a plurality of DRX groups associated with the DRX grouping configuration, wherein the first DRX group includes a first subset of the first set of network nodes. The apparatus may include means for communicating, based at least in part on the DRX group information, via at least one of a sidelink or an access link.

Some aspects described herein relate to an apparatus for wireless communication. The apparatus may include means for receiving an indication of a DRX grouping configuration that enables alignment of access link DRX configurations corresponding to a first set of network nodes and sidelink DRX configurations corresponding to the first set of network nodes. The apparatus may include means for transmitting, to a network node of the first set of network nodes, DRX group information associated with the DRX grouping configuration, wherein the DRX group information indicates a first group ID corresponding to a first DRX group of a plurality of DRX groups associated with the DRX grouping configuration, wherein the first DRX group includes a first subset of the first set of network nodes.

Some aspects described herein relate to an apparatus for wireless communication. The apparatus may include means for receiving, from a network node, of a first set of network nodes, group assistance information associated with a second set of network nodes, wherein each network node of the second set of network nodes is in a connected state with respect to the second network node. The apparatus may include means for transmitting an indication of a DRX grouping configuration enabling alignment of access link DRX configurations corresponding to the second set of network nodes and sidelink DRX configurations corresponding to the second set of network nodes.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
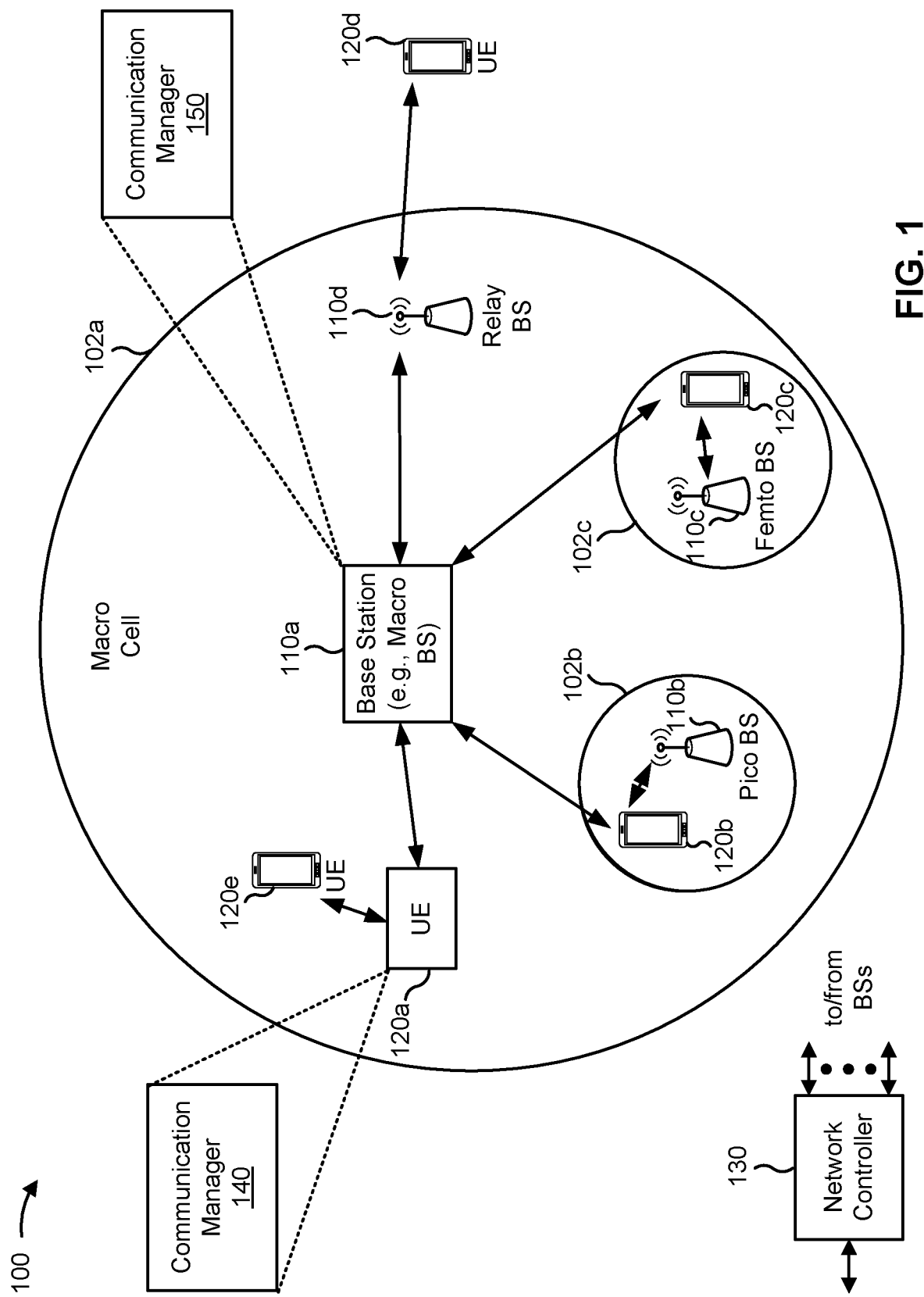
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As described herein, a network node, which may be referred to as a "node," a "network node," or a "wireless node," may be a base station (e.g., base station 110), a UE (e.g., UE 120), a relay device, a network controller, an apparatus, a device, a computing system, one or more components of any of these, and/or another processing entity configured to perform one or more aspects of the techniques described herein. For example, a network node may be a UE. As another example, a network node may be a base station. A network node may be an aggregated base station and/or one or more components of a disaggregated base station. As an example, a first network node may be configured to communicate with a second network node or a third network node. The adjectives "first," "second," "third," and so on are used for contextual distinction between two or more of the modified noun in connection with a discussion and are not meant to be absolute modifiers that apply only to a certain respective node throughout the entire document. For example, a network node may be referred to as a "first network node" in connection with one discussion and may be referred to as a "second network node" in connection with another discussion, or vice versa. Reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses that a first network node being configured to receive information from a second network node, the first network node may refer to a first UE, a first base station, a first apparatus, a first device, a first computing system, a first one or more components, a first processing entity, or the like configured to receive the information from the second network; and the second network node may refer to a second UE, a second base station, a second apparatus, a second device, a second computing system, a first one or more components, a first processing entity, or the like.

In some aspects, the first network node may include a communication manager 140 or 150. As described in more detail elsewhere herein, the communication manager 140 or 150 may receive discontinuous reception (DRX) group information associated with a DRX grouping configuration that enables alignment of access link DRX configurations corresponding to a first set of network nodes and sidelink DRX configurations corresponding to the first set of network nodes, wherein the DRX group information indicates a first group identifier (ID) corresponding to a first DRX group of a plurality of DRX groups associated with the DRX grouping configuration, wherein the first DRX group includes a first subset of the first set of network nodes; and communicate, based at least in part on the DRX group information, via at least one of a sidelink or an access link.

In some aspects, the communication manager 140 or 150 may receive an indication of a DRX grouping configuration that enables alignment of access link DRX configurations corresponding to a second set of network nodes and sidelink DRX configurations corresponding to the second set of network nodes; and transmit, to a second network node of the second set of network nodes, DRX group information associated with the DRX grouping configuration, wherein the DRX group information indicates a first group ID corresponding to a first DRX group of a plurality of DRX groups associated with the DRX grouping configuration, wherein the first DRX group includes a first subset of the second set of network nodes.

In some aspects, the communication manager 140 or 150 may receive, from a second network node, of a first set of network nodes, group assistance information associated with a second set of network nodes, wherein each network node of the second set of network nodes is in a connected state with respect to the second network node; and transmit an indication of a DRX grouping configuration enabling alignment of access link DRX configurations corresponding to the second set of network nodes and sidelink DRX configurations corresponding to the second set of network nodes. Additionally, or alternatively, the communication manager 140 or 150 may perform one or more other operations described herein.

As indicated above, FIG. 1 is provided as an example. Other examples may differ from what is described with regard to FIG. 1.

Figure 2:
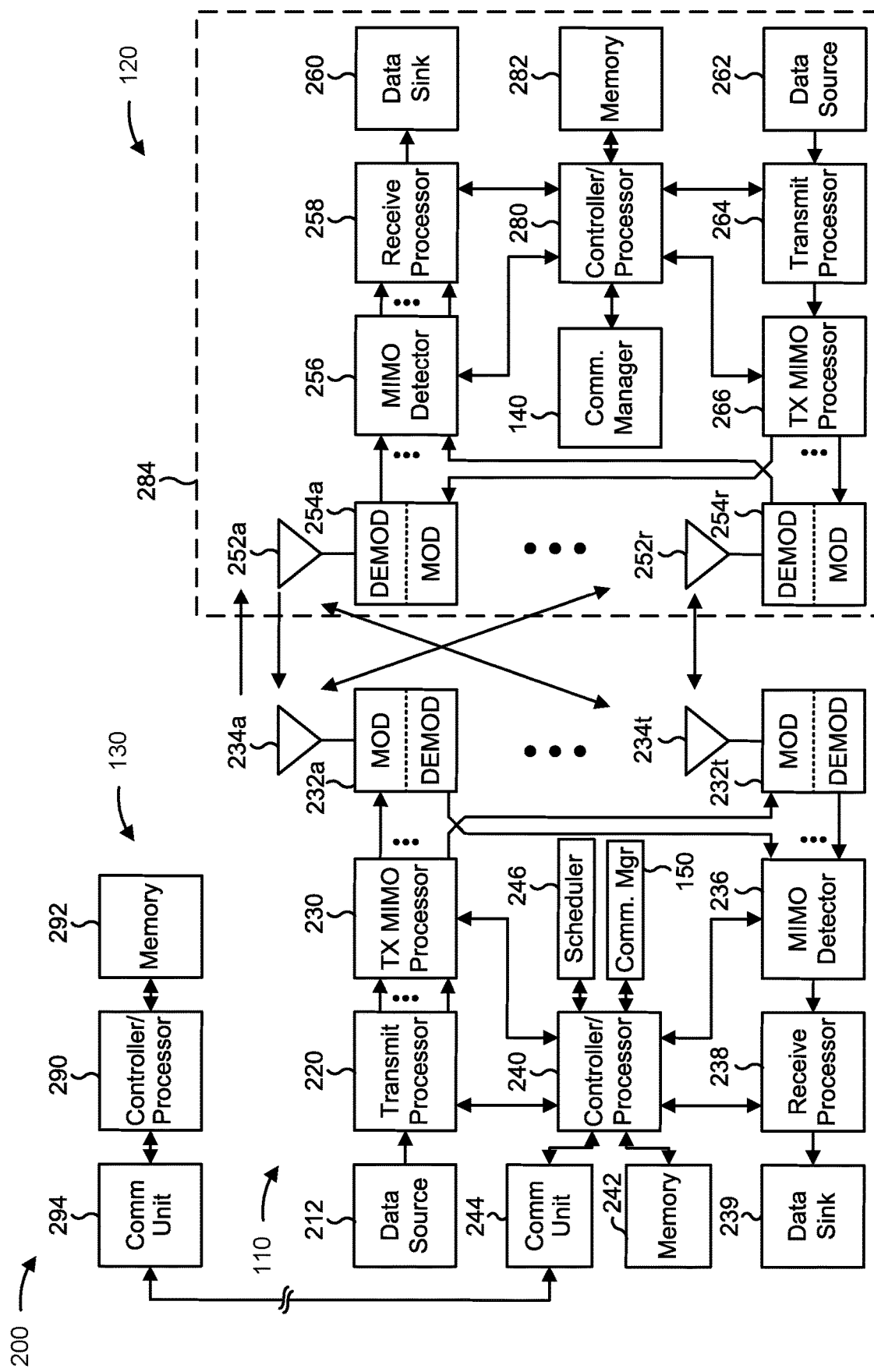
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

In some aspects, the term "base station" (e.g., the base station 110) may refer to one or more components of a disaggregated base station. Additionally, since the term "network node" may refer to a base station, the term "network node" also may refer to one or more components of a disaggregated base station, as described below. For example, in some aspects, "base station" may refer to a control unit, a distributed unit, a plurality of control units, a plurality of distributed units, and/or a combination thereof. In some aspects, "base station" may refer to one device configured to perform one or more functions such as those described above in connection with the base station 110. In some aspects, "base station" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" may refer to any one or more of those different devices. In some aspects, "base station" may refer to one or more virtual base stations, one or more virtual base station functions, and/or a combination of thereof. For example, in some cases, two or more base station functions may be instantiated on a single device. In some aspects, "base station" may refer to one of the base station functions and not another. In this way, a single device may include more than one base station.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-9).

The controller/processor 240 of the base station 110, the controller/processor 280 of the UE 120, and/or any other component(s) of FIG. 2 may perform one or more techniques associated with group-based DRX alignment, as described in more detail elsewhere herein. In some aspects, the network node described herein is the base station 110, is included in the base station 110, or includes one or more components of the base station 110 shown in FIG. 2. In some aspects, the network node described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a first network node includes means for receiving DRX group information associated with a DRX grouping configuration that enables alignment of access link DRX configurations corresponding to a first set of network nodes and sidelink DRX configurations corresponding to the first set of network nodes, wherein the DRX group information indicates a first group ID corresponding to a first DRX group of a plurality of DRX groups associated with the DRX grouping configuration, wherein the first DRX group includes a first subset of the first set of network nodes (e.g., using antenna 252, modem 254, MIMO detector 256, receive processor 258, controller/processor 280, memory 282, antenna 234, modem 232, MIMO detector 236, receive processor 238, controller/processor 240, memory 242, or the like); and/or means for communicating, based at least in part on the DRX group information, via at least one of a sidelink or an access link (e.g., using controller/processor 280, transmit processor 264, TX MIMO processor 266, antenna 252, modem 254, MIMO detector 256, receive processor 258, controller/processor 280, memory 282, antenna 234, modem 232, MIMO detector 236, receive processor 238, controller/processor 240, memory 242, transmit processor 220, TX MIMO processor 230, or the like). In some aspects, the means for the first network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the first network node to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the first network node includes means for receiving an indication of a DRX grouping configuration that enables alignment of access link DRX configurations corresponding to a second set of network nodes and sidelink DRX configurations corresponding to the second set of network nodes (e.g., using antenna 234, modem 232, MIMO detector 236, receive processor 238, controller/processor 240, memory 242, or the like); and/or means for transmitting, to a second network node of the second set of network nodes, DRX group information associated with the DRX grouping configuration, wherein the DRX group information indicates a first group ID corresponding to a first DRX group of a plurality of DRX groups associated with the DRX grouping configuration, wherein the first DRX group includes a first subset of the second set of network nodes (e.g., using controller/processor 240, transmit processor 220, TX MIMO processor 230, modem 232, antenna 234, memory 242, or the like).

In some aspects, the first network node includes means for receiving, from a second network node, of a first set of network nodes, group assistance information associated with a second set of network nodes, wherein each network node of the second set of network nodes is in a connected state with respect to the second network node (e.g., using antenna 234, modem 232, MIMO detector 236, receive processor 238, controller/processor 240, memory 242, or the like); and/or means for transmitting an indication of a DRX grouping configuration enabling alignment of access link DRX configurations corresponding to the second set of network nodes and sidelink DRX configurations corresponding to the second set of network nodes (e.g., using controller/processor 240, transmit processor 220, TX MIMO processor 230, modem 232, antenna 234, memory 242, or the like). In some aspects, the means for the first network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
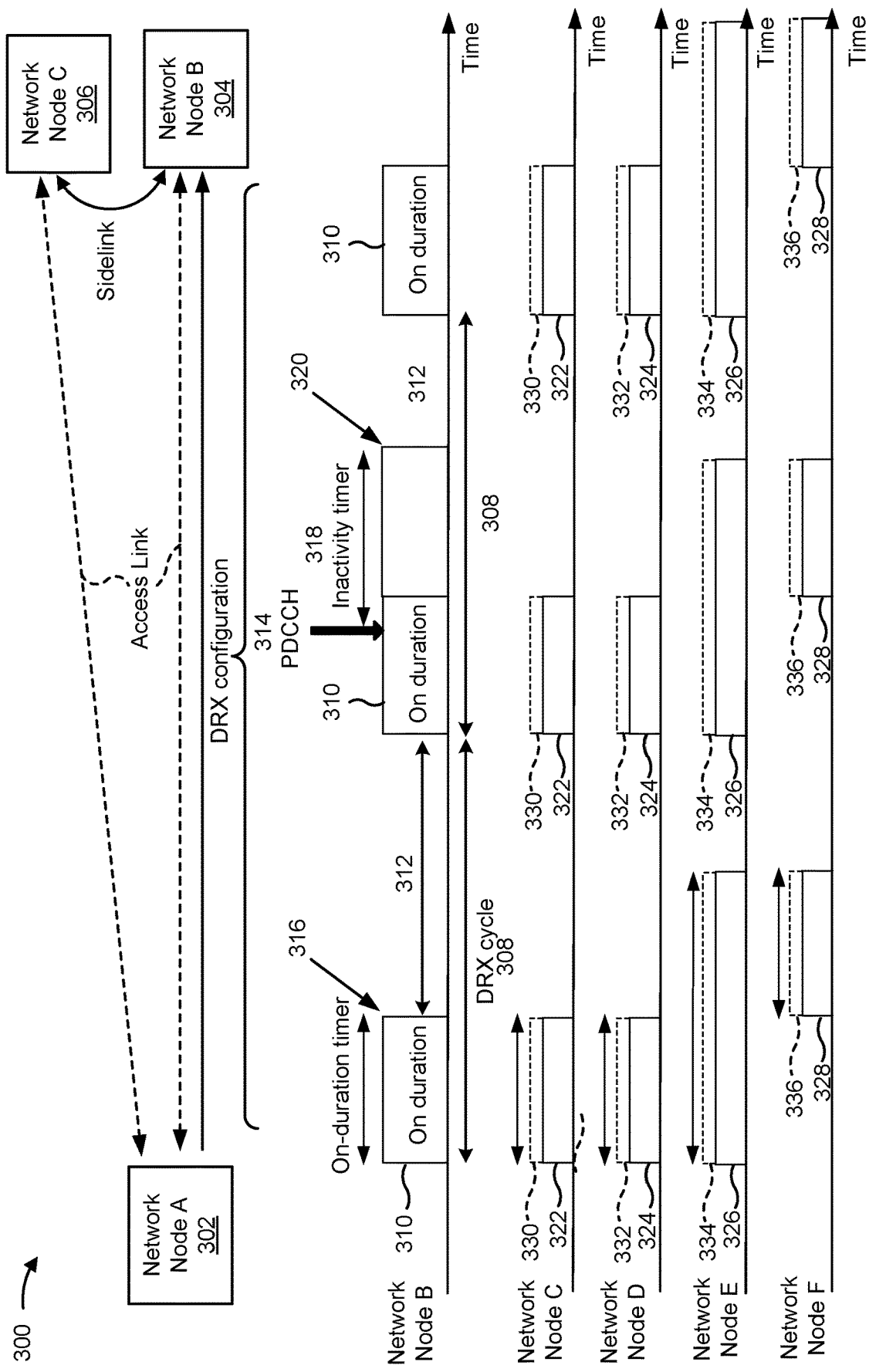
FIG. 3 is a diagram illustrating an example of a discontinuous reception (DRX) configuration, in accordance with the present disclosure.

FIG. 3 is a diagram illustrating an example 300 of a DRX configuration, in accordance with the present disclosure. As shown in FIG. 3, a network node A 302 may communicate with a network node B 304. The network node B 304 may communicate with a network node C 306. In some aspects, for example, the network node A 302 may include a base station and the network nodes B and C may include UEs.

As shown, the network node A 302 may transmit a DRX configuration to the network node B 304 to configure a DRX cycle 308 for the network node B 304. A DRX cycle 308 may include a DRX on duration 310 (e.g., during which the network node B 304 is awake or in an active state) and an opportunity to enter a DRX sleep state 312. As used herein, the time during which the network node B 304 is configured to be in an active state during the DRX on duration 310 may be referred to as an active time, and the time during which the network node B 304 is configured to be in the DRX sleep state 312 may be referred to as an inactive time.

A DRX cycle 308 can be configured for any number of different types of communication connections. For example, in some cases, the DRX configuration can be an access link DRX configuration or a sidelink DRX configuration, among other examples. In the case of an access link DRX configuration, the network node B 304 may monitor a physical downlink control channel (PDCCH) during the active time, the network node B 304 and may refrain from monitoring the PDCCH during the inactive time. In the case of a sidelink DRX configuration, the network node B 304 may monitor a physical sidelink control channel (PSCCH) during the on duration, and the network node B 304 may refrain from monitoring the PSCCH during the inactive time.

During the DRX on duration 310 (e.g., the active time), the network node B 304 may monitor a downlink control channel (e.g., a PDCCH), as shown by reference number 314. For example, the network node B 304 may monitor the PDCCH for downlink control information (DCI) pertaining to the network node B 304. If the network node B 304 does not detect and/or successfully decode any PDCCH communications intended for the network node B 304 during the DRX on duration 310, then the network node B 304 may enter the sleep state 312 (e.g., for the inactive time) at the end of the DRX on duration 310, as shown by reference number 316. In this way, the network node B 304 may conserve battery power and reduce power consumption. As shown, the DRX cycle 308 may repeat with a configured periodicity according to the DRX configuration.

If the network node B 304 detects and/or successfully decodes a PDCCH communication intended for the network node B 304, then the network node B 304 may remain in an active state (e.g., awake) for the duration of a DRX inactivity timer 318 (e.g., which may extend the active time). The network node B 304 may start the DRX inactivity timer 318 at a time at which the PDCCH communication is received (e.g., in a transmission time interval (TTI) in which the PDCCH communication is received, such as a slot or a subframe). The network node B 304 may remain in the active state until the DRX inactivity timer 318 expires, at which time the network node B 304 may enter the sleep state 312 (e.g., for the inactive time), as shown by reference number 320. During the duration of the DRX inactivity timer 318, the network node B 304 may continue to monitor for PDCCH communications, may obtain a downlink data communication (e.g., on a downlink data channel, such as a physical downlink shared channel (PDSCH)) scheduled by the PDCCH communication, and/or may prepare and/or transmit an uplink communication (e.g., on a physical uplink shared channel (PUSCH)) scheduled by the PDCCH communication. The network node B 304 may restart the DRX inactivity timer 318 after each detection of a PDCCH communication for network node B 304 for an initial transmission (e.g., but not for a retransmission). By operating in this manner, the network node B 304 may conserve battery power and reduce power consumption by entering the sleep state 312.

As indicated above, and as shown in FIG. 3, the network node B 304 may communicate with a network node C 306 via a sidelink. In some aspects, the network node B 304 may communicate with any number of additional network nodes. In that case, the network node A 302 can transmit a sidelink DRX configuration to the network node B 304 to configure a sidelink DRX cycle in addition to the access link DRX cycle 308 associated with an access link through which the network node A 302 communicates with the network node B 304. Similarly, the network node A 302 can communicate with network node C 306 via an access link and can configured the network node C 306 with an access link DRX configuration and/or a sidelink DRX configuration. As shown, a number of other DRX configurations can be configured by the network node A 302 (labeled, respectively, as "network node D," "network node E," and "network node F").

In some cases, the communications between each network node pair is bi-directional (e.g., each network node can be a transmit (Tx) network node and a receive (Rx) network node). Additionally, in some cases, each of the network nodes that communicate via the sidelink also can be connected to the network node A 302 via access links. For example, in cases in which the network node A 302 is a base station and the network nodes B, C, D, E, and/or F are UEs, the network nodes can be radio resource control (RRC) connected to the network node A 302.

So that network nodes (e.g., network node B, network node C, network node D, network node E, and/or network node F) can communicate with one another over sidelink, the sidelink DRX configurations of the communicating network nodes can be aligned. For example, as shown in FIG. 3, the sidelink DRX configuration corresponding to the network node C 306 is aligned with the sidelink DRX configuration of the network node B 304. A first DRX configuration is aligned with a second DRX configuration when the DRX on duration associated with the first DRX configuration at least partially overlaps, in the time domain, a DRX on duration associated with the second DRX configuration.

For example, the DRX configuration associated with the DRX cycle 308 may be a sidelink DRX configuration. As shown, the DRX on duration 310 fully overlaps a sidelink DRX on duration 322. As a result, the network node B 304 and the network node C 306 will both be in active states at the same time. Similarly, as shown, a sidelink DRX on duration 324 corresponding to the network node D also can be aligned (in this case, fully overlapping) with the sidelink DRX on durations 310 and 322. Additionally, a sidelink DRX on duration 326 corresponding to the network node E can be aligned (in this case, partially overlapping) with the sidelink DRX on durations 310, 322, and 324. As shown, however, a sidelink DRX on duration 328 corresponding to the network node F is not aligned with the sidelink DRX on durations 310, 322, or 324, though it is aligned with the sidelink DRX on duration 326 due to partial overlap in the time domain.

In some cases, to reduce unnecessary power consumption by the network nodes, an access link DRX configuration corresponding to a network node can be aligned with the corresponding sidelink DRX configuration. For example, as shown in FIG. 3, an access link DRX on duration 330 corresponding to the network node C 306 can be aligned with the sidelink DRX on duration 322. Similarly, an access link DRX on duration 332 corresponding to the network node D can be aligned with the sidelink DRX on duration 324, an access link DRX on duration 334 corresponding to the network node E can be aligned with the sidelink DRX on duration 326, and an access link DRX on duration 336 corresponding to the network node F can be aligned with the sidelink DRX on duration 328.

DRX configuration alignment among network nodes can result in a reduction in latency. The tradeoff can be a reduction in resource utilization, however. For example, if all of the network nodes depicted in FIG. 3 had DRX configurations that were fully overlapping (e.g., as is the case for network nodes B, C, and D), available communication resources during the inactive periods can be wasted, resulting in a negative impact on network efficiency. By aligning the DRX on durations 328 and 336 corresponding to network node F with the DRX on durations 326 and 334 corresponding to network node E (in the case that network node E and network node F communicate with one another over sidelink), more of the available resources are utilized. However, as shown, if network node E also communicates with one or more of the network nodes B, C, and D, the sidelink DRX on duration 326 corresponding to network node E is extended beyond the length of duration of the other DRX on durations, resulting in a higher power consumption by the network node E. Organizing and optimizing the various alignment of DRX configurations can be a challenging task, particularly as the number of network nodes in a communication environment increases.

Some aspects of the techniques and apparatuses described herein provide for centralized DRX alignment based on DRX groups. For example, in some aspects, a central network node may determine a DRX grouping configuration and transmit an indication of that DRX grouping configuration to one or more network nodes that are configured to manage one or more DRX groups. Network nodes within a DRX group may have DRX configurations that are aligned, while DRX configurations of network nodes not in the same group may not be aligned unless the network nodes communicate with one another (e.g., over a sidelink). In this way, some aspects may facilitate balancing efficient resource utilization while reducing latency and power consumption by network nodes, thereby having a positive impact on network performance.

As indicated above, FIG. 3 is provided as an example. Other examples may differ from what is described with respect to FIG. 3.

Figure 4:
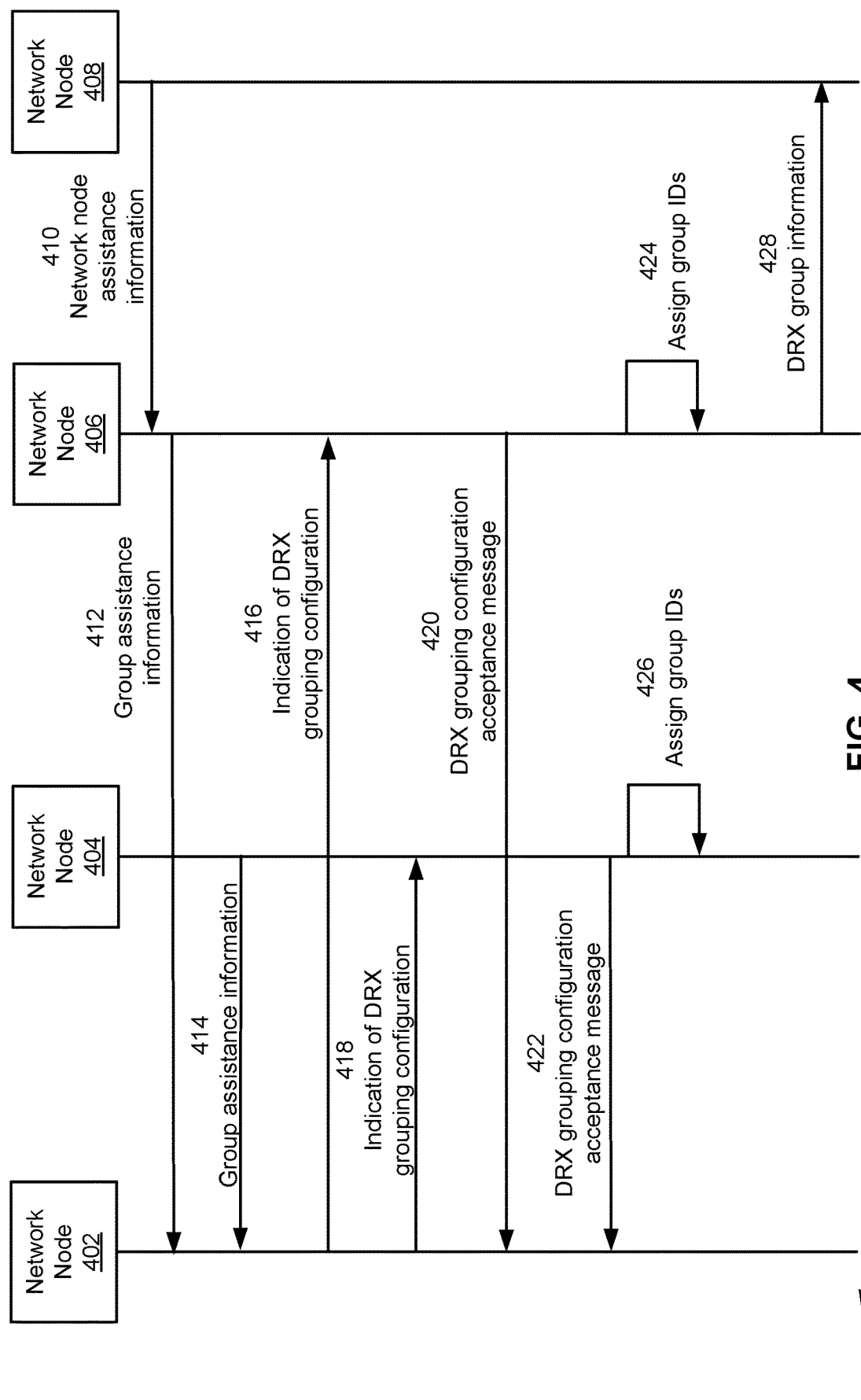
FIG. 4 illustrates an example of a call flow associated with group-based DRX alignment, in accordance with the present disclosure.

FIG. 4 illustrates an example 400 of a call flow associated with group-based DRX alignment, in accordance with the present disclosure. As shown, a network node 402, a network node 404, a network node 406, and a network node 408 each may communicate with one or more of the other network nodes (or other network nodes not shown in FIG. 4). In some aspects, for example, the network nodes 402, 404, and 406 may include base stations and the network node 408 may include a UE. The network node 402 may be configured to be a central network node for facilitating group-based DRX alignment.

As shown by reference number 410, the network node 408 may transmit, and the network node 406 may receive, network node assistance information. The network node assistance information may be associated with at least one of a Tx node or an Rx node. In some aspects, the network node assistance information may include DRX group information associated with a first DRX group, a second DRX group, and/or any number of other DRX groups.

As shown by reference number 412, the network node 406 may transmit, and the network node 402 may receive, group assistance information. In some aspects, the group assistance information may indicate at least one of a number of network nodes that are in a connected state with the network node 406 or a traffic load associated with each of the network nodes that are in the connected state with the network node 406. As shown by reference number 414, the network node 404 also may transmit, and the network node 402 may receive, group assistance information associated with the network node 404.

As shown by reference number 416, the network node 402 may transmit, and the network node 406 may receive, an indication of a DRX grouping configuration. As shown by reference number 418, the network node 402 also may transmit the indication of the DRX grouping configuration to the network node 404. In some aspects, the DRX grouping configuration enables alignment of access link DRX configurations corresponding to a set of network nodes (where the set of network nodes includes the network node 408) and sidelink DRX configurations corresponding to the set of network nodes. In some aspects, for example, the network nodes 402 and 406 may both be RAN nodes, and the indication of the DRX grouping configuration may be transmitted using a RAN node interface application protocol message such as, for example, an XnAP message.

In some aspects, the indication of the DRX grouping configuration may indicate at least one of a number of DRX groups in a plurality of DRX groups, a start time associated with each of the plurality of DRX groups, or an on duration associated with each of the plurality of DRX groups. The start time may refer, for example, to a start time of a DRX on duration associated with the DRX group. In some aspects, the DRX grouping configuration may be based at least in part on the group assistance information.

As shown by reference number 420, the network node 406 may transmit, and the network node 402 may receive, a DRX grouping configuration acceptance message based at least in part on receiving the indication of the DRX grouping configuration. As shown by reference number 422, the network node 404 also may transmit a DRX grouping configuration acceptance message to the network node 402.

As shown by reference number 424, the network node 406 may assign group IDs corresponding to DRX groups that it manages. For example, the network node 406 may assign a first group ID to the network node 408. As shown by reference number 426, the network node 404 also may assign group IDs associated with groups that it manages. In some aspects, the group ID may be based at least in part on at least one of a UE identity corresponding to the network node 408, an existence of a sidelink connection between the network node 408 and an additional network node, a resource allocation mode associated with the network node 408, a quality of service (QoS) requirement associated with the network node 408, a DRX group status of the first DRX group, or a power consumption status associated with the network node 408. In some aspects, the DRX group status may include at least one of a number of network nodes included in the first DRX group or a traffic load associated with the first DRX group.

As shown by reference number 428, the network node 406 may transmit, and the network node 408 may receive, DRX group information. In some aspects, the network node 406 may transmit an RRC message that includes a group ID information element that indicates the first group ID. In some aspects, the DRX group information may indicate a first group ID corresponding to a first DRX group of a plurality of DRX groups associated with the DRX grouping configuration. The first DRX group may include, for example, the network node 408.

In some aspects, the group IDs may be assigned based at least in part on an analysis (e.g., performed by the network node 406, the network node 404, and/or the network node 402) associated with balancing DRX alignment with resource usage. In some aspects, for example, access link DRX configurations may be aligned within groups and/or between groups. Similarly, sidelink DRX configurations may be aligned within groups or between groups.

As indicated above, FIG. 4 is provided as an example. Other examples may differ from what is described with respect to FIG. 4.

Figure 5:
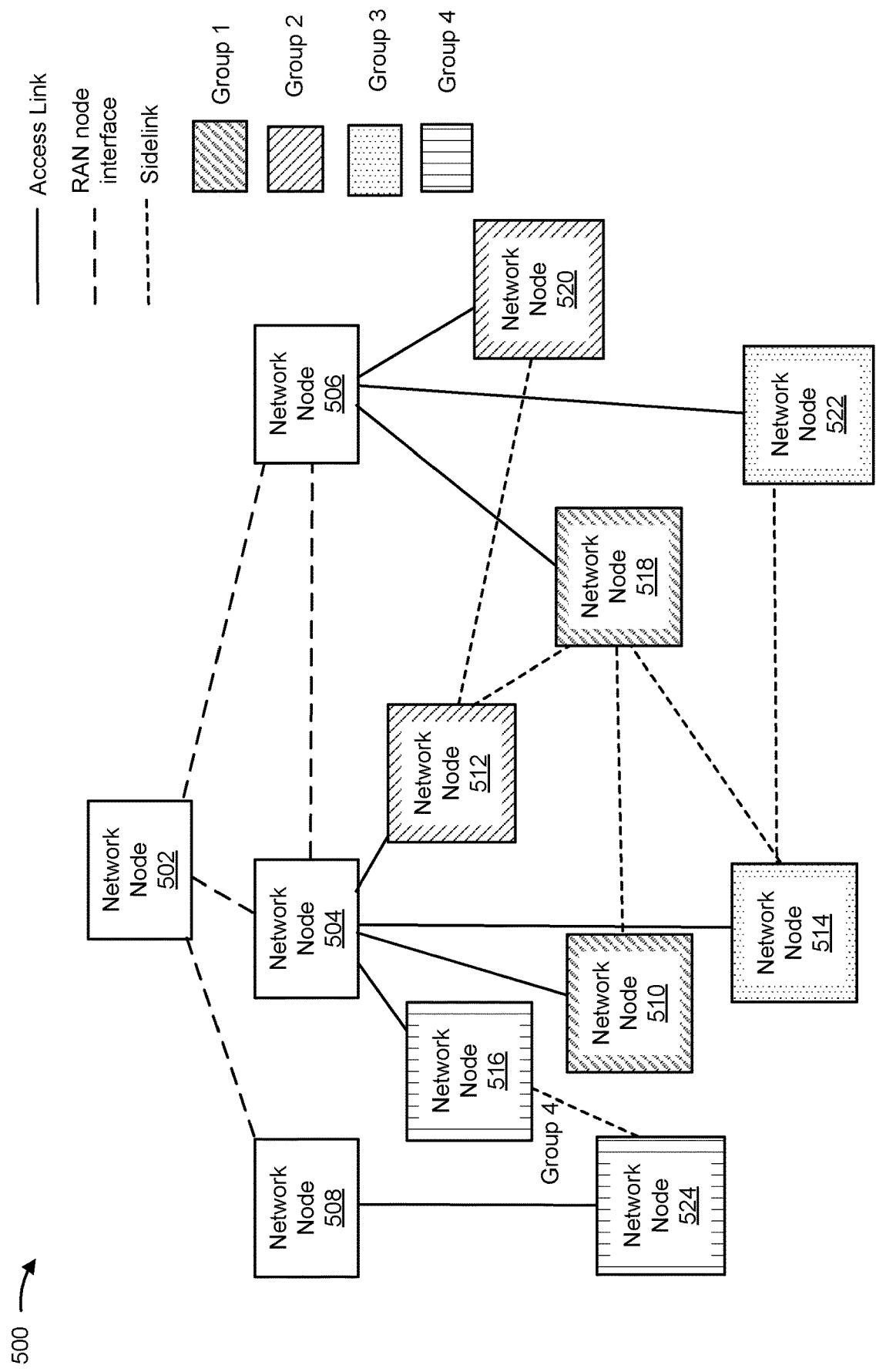
FIG. 5 is a diagram illustrating an example associated with group-based DRX alignment, in accordance with the present disclosure.

FIG. 5 is a diagram illustrating an example 500 of grouping-based DRX alignment, in accordance with the present disclosure. The example 500 depicts illustrative groupings and communication connections within a communication environment. As shown, a central network node 502 may communicate with a network node 504, a network node 506, and a network node 508 using RAN node application protocol interfaces. A network node 510, a network node 512, a network node 514, and a network node 516 are connected to network node 504 via access links. A network node 518, a network node 520, and a network node 522 are connected to network node 506 via access links.

A network node 524 is connected to network node 508 via an access link. The network node 510 communicates with the network node 518 via a sidelink. The network node 512 and the network node 514 also communicate with network node 518 over a sidelink. The network node 512 also communicates with the network node 520 over a sidelink, and the network node 514 communicates with the network node 522 over a sidelink. The network node 516 communicates with the network node 524 over a sidelink. A first DRX group includes the network node 510 and the network node 518. A second DRX group includes the network node 512 and the network node 520. A third DRX group includes the network node 514 and the network node 522, and a fourth DRX group includes the network node 516 and the network node 524. Each network node is included in only one DRX group.

The DRX configurations of two network nodes that communicate via sidelink but are not in the same group may be not aligned or partially aligned. For example, in some aspects, there may be no type 1 DRX alignment between the two network nodes. Even if the two network nodes are in different groups, type 2 DRX alignment is still achieved. Type DRX alignment is alignment of a Tx network node's access link DRX configuration with an Rx network node's sidelink DRX configuration. In some aspects, one or both of the network nodes may extend a respective sidelink DRX configuration or access link DRX configuration to achieve type 1 alignment. In some aspects, the DRX alignment may be configured in accordance with priority levels assigned to the network nodes. For example, DRX alignment may be prioritized among some network nodes of high priority. Prioritization may be determined based on DRX groups such that all of the network nodes within a group have the same priority, and the DRX alignments are made in the order of group priority.

As indicated above, FIG. 5 is provided as an example. Other examples may differ from what is described with respect to FIG. 5.

Figure 6:
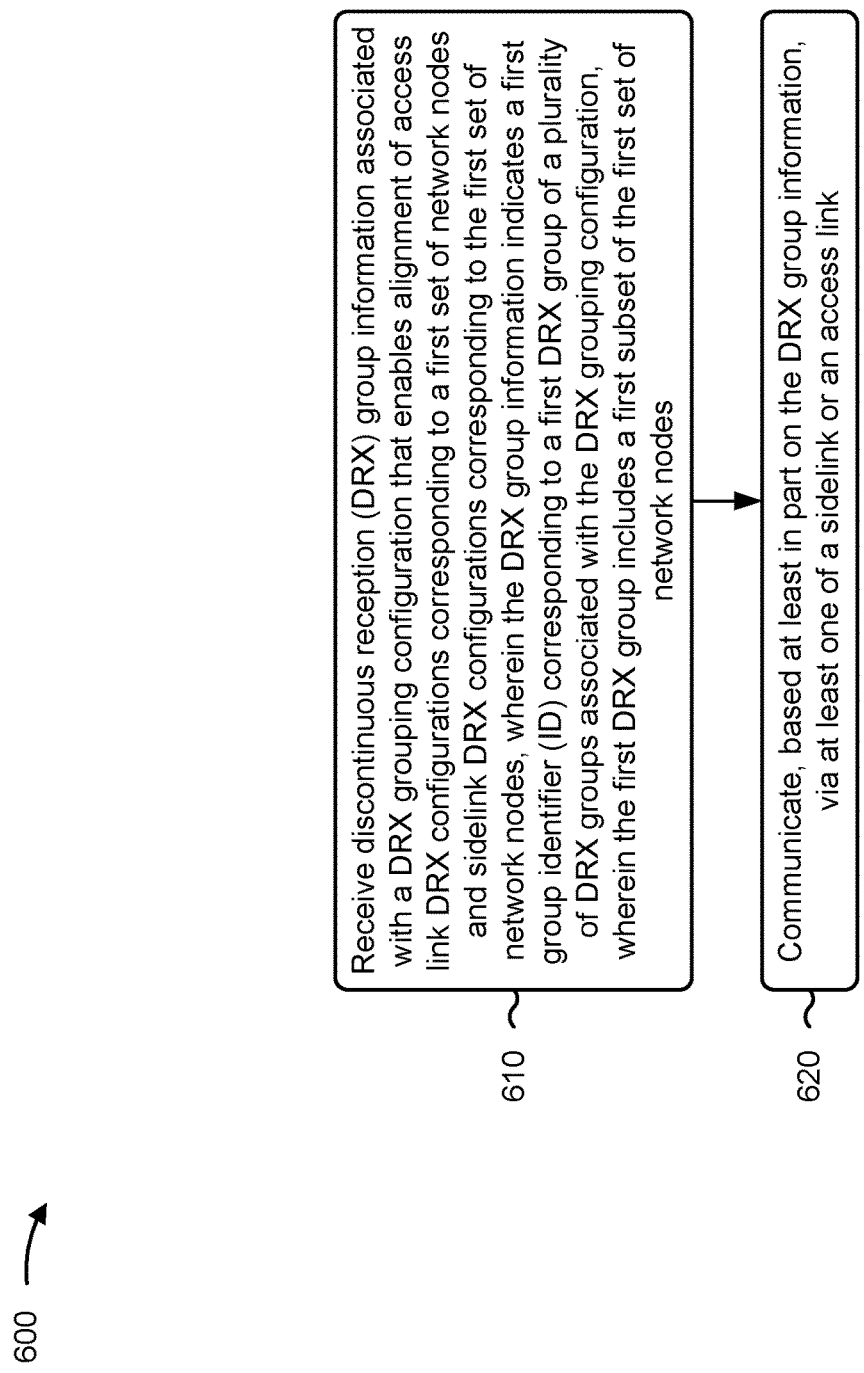
FIGS. 6-8 are diagrams illustrating example processes associated with group-based DRX alignment, in accordance with the present disclosure.

FIG. 6 is a diagram illustrating an example process 600 performed, for example, by a first network node, in accordance with the present disclosure. Example process 600 is an example where the first network node (e.g., network node 408) performs operations associated with group-based DRX alignment.

As shown in FIG. 6, in some aspects, process 600 may include receiving DRX group information associated with a DRX grouping configuration that enables alignment of access link DRX configurations corresponding to a first set of network nodes and sidelink DRX configurations corresponding to the first set of network nodes, wherein the DRX group information indicates a first group ID corresponding to a first DRX group of a plurality of DRX groups associated with the DRX grouping configuration, wherein the first DRX group includes a first subset of the first set of network nodes (block 610). For example, the first network node (e.g., using communication manager 908 and/or reception component 902, depicted in FIG. 9) may receive DRX group information associated with a DRX grouping configuration that enables alignment of access link DRX configurations corresponding to a first set of network nodes and sidelink DRX configurations corresponding to the first set of network nodes, wherein the DRX group information indicates a first group ID corresponding to a first DRX group of a plurality of DRX groups associated with the DRX grouping configuration, wherein the first DRX group includes a first subset of the first set of network nodes, as described above, for example, with reference to FIGS. 4 and/or 5.

As further shown in FIG. 6, in some aspects, process 600 may include communicating, based at least in part on the DRX group information, via at least one of a sidelink or an access link (block 620). For example, the first network node (e.g., using communication manager 908, reception component 902, and/or transmission component 904, depicted in FIG. 9) may communicate, based at least in part on the DRX group information, via at least one of a sidelink or an access link, as described above, for example, with reference to FIGS. 4 and/or 5.

Process 600 may include additional aspects, such as any single aspect or any combination of aspects described below and/or in connection with one or more other processes described elsewhere herein.

In some aspects, the first subset of network nodes includes the first network node, wherein each of a first set of access link DRX configurations corresponds to each network node of the first subset of the first set of network nodes, and wherein a first access link DRX configuration, of the first set of access link DRX configurations, corresponding to the first network node is aligned with each other access link DRX configuration of the first set of access link DRX configurations.

In some aspects, the first access link DRX configuration is not aligned with a second access link DRX configuration, of a second set of access link DRX configurations corresponding to a second subset of the first set of network nodes.

In some aspects, the first subset of network nodes includes the first network node, wherein each of a first set of sidelink DRX configurations corresponds to each network node of the first subset of network nodes, and wherein a first sidelink DRX configuration, of the first set of sidelink DRX configurations, corresponding to the first network node is aligned with each other sidelink DRX configuration of the first set of sidelink DRX configurations.

In some aspects, the first sidelink DRX configuration is not aligned with a second sidelink DRX configuration, of a second set of sidelink DRX configurations corresponding to a second subset of the first set of network nodes.

In some aspects, the first subset of network nodes includes the first network node, wherein each of a first set of access link DRX configurations corresponds to each network node of the first subset of the first set of network nodes, and wherein a first access link DRX configuration, of the first set of access link DRX configurations, corresponding to the first network node is aligned with each of a first set of access link DRX configurations corresponding to the first subset of the first set of network nodes.

In some aspects, the first access link DRX configuration is not aligned with a second sidelink DRX configuration, of a second set of sidelink DRX configurations corresponding to a second subset of the first set of network nodes.

In some aspects, receiving the DRX group information comprises receiving an RRC message that includes a group ID information element that indicates the first group ID.

In some aspects, the first group ID is based at least in part on at least one of a UE identity corresponding to the first network node, an existence of a sidelink connection between the first network node and a second network node of the first set of network nodes, a resource allocation mode associated with the first network node, a QoS requirement associated with the first network node, a DRX group status of the first DRX group, or a power consumption status associated with the first network node.

In some aspects, the first network node is a Tx node, the method further comprising receiving network node assistance information from a Rx node, and transmitting the network node assistance information to a second network node of a second set of network nodes.

In some aspects, the network node assistance information comprises DRX group information associated with a second DRX group of the plurality of DRX groups, wherein the second DRX group includes the Rx node.

In some aspects, the DRX group information indicates a second group ID corresponding to the second DRX group.

In some aspects, a second DRX group of the plurality of DRX groups includes a second network node of the first set of network nodes.

In some aspects, no DRX configuration associated with the first network node is aligned with any DRX configuration associated with the second network node.

In some aspects, process 600 includes extending an on duration of a first DRX configuration associated with the first network node so that the first DRX configuration is aligned with a second DRX configuration associated with the second network node.

In some aspects, the first DRX configuration comprises an access link DRX configuration and wherein the second DRX configuration comprises a sidelink DRX configuration.

In some aspects, a first DRX configuration associated with the first network node is aligned with a second DRX configuration associated with the second network node based at least in part on a first DRX alignment priority level, corresponding to the first network node, being lower than a second DRX alignment priority level corresponding to the second network node.

In some aspects, the first DRX alignment priority level corresponds to the first DRX group.

In some aspects, process 600 includes adjusting, based at least in part on the first DRX alignment priority level being lower than the second DRX alignment priority level, at least one on duration of a first DRX configuration associated with the first network node so that the first DRX configuration is aligned with a second DRX configuration associated with the second network node.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
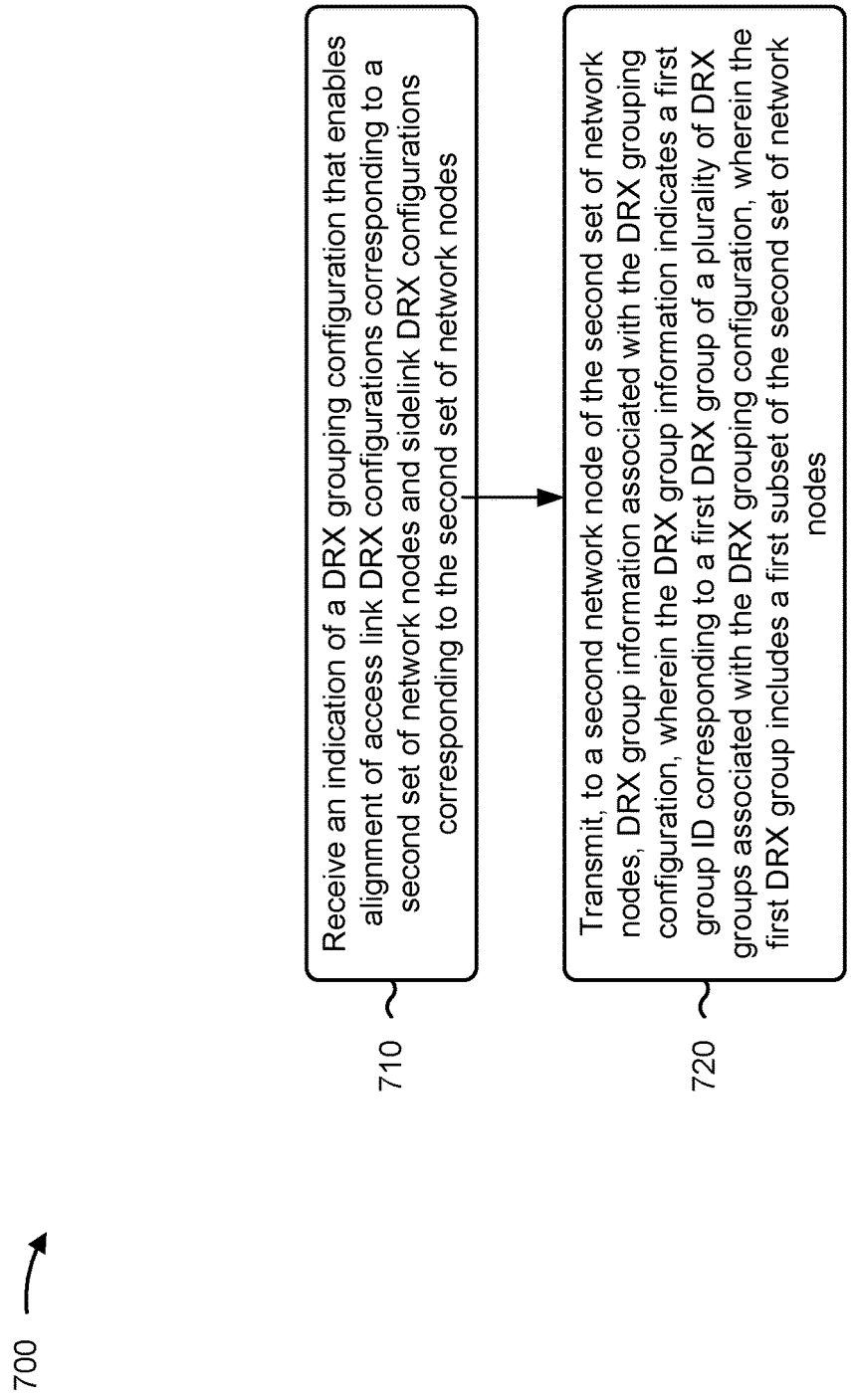

FIG. 7 is a diagram illustrating an example process 700 performed, for example, by a first network node, in accordance with the present disclosure. Example process 700 is an example where the first network node (e.g., network node 406) performs operations associated with group-based DRX alignment.

As shown in FIG. 7, in some aspects, process 700 may include receiving an indication of a DRX grouping configuration that enables alignment of access link DRX configurations corresponding to a second set of network nodes and sidelink DRX configurations corresponding to the second set of network nodes (block 710). For example, the first network node (e.g., using communication manager 908 and/or reception component 902, depicted in FIG. 9) may receive an indication of a DRX grouping configuration that enables alignment of access link DRX configurations corresponding to a second set of network nodes and sidelink DRX configurations corresponding to the second set of network nodes, as described above, for example, with reference to FIGS. 4 and/or 5.

As further shown in FIG. 7, in some aspects, process 700 may include transmitting, to a second network node of the second set of network nodes, DRX group information associated with the DRX grouping configuration, wherein the DRX group information indicates a first group ID corresponding to a first DRX group of a plurality of DRX groups associated with the DRX grouping configuration, wherein the first DRX group includes a first subset of the second set of network nodes (block 720). For example, the first network node (e.g., using communication manager 908 and/or transmission component 904, depicted in FIG. 9) may transmit, to a second network node of the second set of network nodes, DRX group information associated with the DRX grouping configuration, wherein the DRX group information indicates a first group ID corresponding to a first DRX group of a plurality of DRX groups associated with the DRX grouping configuration, wherein the first DRX group includes a first subset of the second set of network nodes, as described above, for example, with reference to FIGS. 4 and/or 5.

Process 700 may include additional aspects, such as any single aspect or any combination of aspects described below and/or in connection with one or more other processes described elsewhere herein.

In some aspects, the first subset of the second set of network nodes includes the second network node, wherein each of a first set of access link DRX configurations corresponds to each network node of the first subset of the second set of network nodes, and wherein a first access link DRX configuration, of the first set of access link DRX configurations, corresponding to the second network node is aligned with each other access link DRX configuration of the first set of access link DRX configurations.

In some aspects, the first access link DRX configuration is not aligned with a second access link DRX configuration, of a second set of access link DRX configurations corresponding to a second subset of the second set of network nodes.

In some aspects, the first subset of the second set of network nodes includes the first network node, wherein each of a first set of sidelink DRX configurations corresponds to each network node of the first subset, and wherein a first sidelink DRX configuration, of the first set of sidelink DRX configurations, corresponding to the second network node is aligned with each other sidelink DRX configuration of the first set of sidelink DRX configurations.

In some aspects, the first sidelink DRX configuration is not aligned with a second sidelink DRX configuration, of a second set of sidelink DRX configurations corresponding to a second subset of the second set of network nodes.

In some aspects, the first subset of network nodes includes the second network node, wherein each of a first set of access link DRX configurations corresponds to each network node of the first subset of the second set of network nodes, and wherein a first access link DRX configuration, of the first set of access link DRX configurations, corresponding to the second network node is aligned with each of a first set of access link DRX configurations corresponding to the first subset of the second set of network nodes.

In some aspects, the first access link DRX configuration is not aligned with a second sidelink DRX configuration, of a second set of sidelink DRX configurations corresponding to a second subset of the second set of network nodes.

In some aspects, receiving the indication of the DRX grouping configuration comprises receiving the indication of the DRX grouping configuration from a central network node.

In some aspects, the indication of the DRX grouping configuration indicates at least one of a number of DRX groups in the plurality of DRX groups a start time associated with each of the plurality of DRX groups or an on duration associated with each of the plurality of DRX groups.

In some aspects, process 700 includes transmitting group assistance information that indicates at least one of a number of network nodes of the second set of network nodes that are in a connected state with the first network node or a traffic load associated with each of the network nodes of the second set of network nodes that are in the connected state with the first network node, wherein the DRX grouping configuration is based at least in part on the group assistance information, and transmitting a DRX grouping configuration acceptance message based at least in part on receiving the indication of the DRX grouping configuration.

In some aspects, the first network node comprises a first RAN node, and wherein receiving the indication of the DRX grouping configuration comprises receiving the indication from a second RAN node.

In some aspects, receiving the indication comprises receiving a RAN node interface application protocol message that includes the indication.

In some aspects, process 700 includes assigning the first group ID to the second network node.

In some aspects, the first group ID is based at least in part on at least one of a UE identity corresponding to the second network node, an existence of a sidelink connection between the second network node and a third network node of the second set of network nodes, a resource allocation mode associated with the second network node, a QoS requirement associated with the second network node, a DRX group status of the first DRX group, or a power consumption status associated with the second network node.

In some aspects, the DRX group status comprises at least one of a number of network nodes of the second set of network nodes included in the first DRX group or a traffic load associated with the first DRX group.

In some aspects, transmitting the DRX group information comprises transmitting an RRC message that includes a group ID information element that indicates the first group ID.

In some aspects, the second network node is a Tx node, the method further comprising receiving network node assistance information from the second network node, wherein the network node assistance information is associated with at least one of the Tx node or a Rx node of the second set of network nodes.

In some aspects, the network node assistance information comprises DRX group information associated with a second DRX group of the plurality of DRX groups, wherein the second DRX group includes the Rx node.

In some aspects, the DRX group information indicates a second group ID corresponding to the second DRX group.

In some aspects, a second DRX group of the plurality of DRX groups includes a third network node of the second set of network nodes.

In some aspects, no DRX configuration associated with the second network node is aligned with any DRX configuration associated with the third network node.

In some aspects, an extended on duration of a first DRX configuration associated with the second network node is aligned with a second DRX configuration associated with the third network node.

In some aspects, the first DRX configuration comprises an access link DRX configuration and wherein the second DRX configuration comprises a sidelink DRX configuration.

In some aspects, a first DRX configuration associated with the second network node is aligned with a second DRX configuration associated with the third network node based at least in part on a first DRX alignment priority level, corresponding to the second network node, being lower than a second DRX alignment priority level corresponding to the third network node.

In some aspects, the first DRX alignment priority level corresponds to the first DRX group.

In some aspects, process 700 includes configuring, based at least in part on the first DRX alignment priority level being lower than the second DRX alignment priority level, at least one adjusted on duration of a first DRX configuration associated with the second network node so that the first DRX configuration is aligned with a second DRX configuration associated with the third network node.

In some aspects, the indication of the DRX grouping configuration indicates the first DRX alignment priority level and the second DRX alignment priority level.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
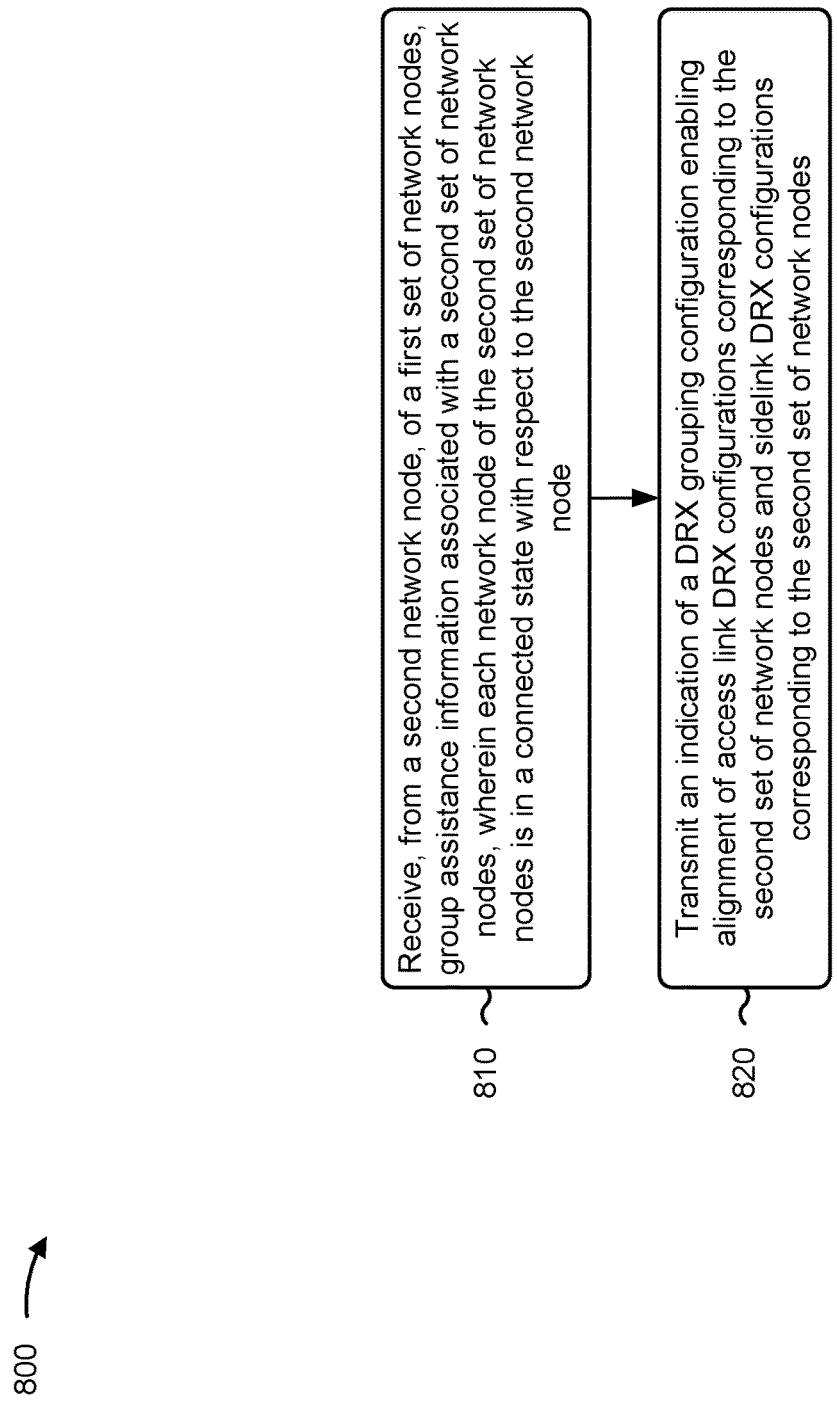

FIG. 8 is a diagram illustrating an example process 800 performed, for example, by a first network node, in accordance with the present disclosure. Example process 800 is an example where the first network node (e.g., network node 402) performs operations associated with group-based DRX alignment.

As shown in FIG. 8, in some aspects, process 800 may include receiving, from a second network node, of a first set of network nodes, group assistance information associated with a second set of network nodes, wherein each network node of the second set of network nodes is in a connected state with respect to the second network node (block 810). For example, the first network node (e.g., using communication manager 908 and/or reception component 902, depicted in FIG. 9) may receive, from a second network node, of a first set of network nodes, group assistance information associated with a second set of network nodes, wherein each network node of the second set of network nodes is in a connected state with respect to the second network node, as described above, for example, with reference to FIGS. 4 and/or 5.

As further shown in FIG. 8, in some aspects, process 800 may include transmitting an indication of a DRX grouping configuration enabling alignment of access link DRX configurations corresponding to the second set of network nodes and sidelink DRX configurations corresponding to the second set of network nodes (block 820). For example, the first network node (e.g., using communication manager 908 and/or transmission component 904, depicted in FIG. 9) may transmit an indication of a DRX grouping configuration enabling alignment of access link DRX configurations corresponding to the second set of network nodes and sidelink DRX configurations corresponding to the second set of network nodes, as described above, for example, with reference to FIGS. 4 and/or 5.

Process 800 may include additional aspects, such as any single aspect or any combination of aspects described below and/or in connection with one or more other processes described elsewhere herein.

In some aspects, the first network node comprises a first base station of the first set of network nodes, and wherein the second network node comprises a second base station of the first set of network nodes.

In some aspects, the indication of the DRX grouping configuration indicates at least one of a number of DRX groups in a plurality of DRX groups, a start time associated with each of the plurality of DRX groups, or an on duration associated with each of the plurality of DRX groups.

In some aspects, process 800 includes receiving group assistance information that indicates at least one of a number of network nodes of the second set of network nodes that are in a connected state with the second network node or a traffic load associated with each of the network nodes of the second set of network nodes that are in the connected state with the second network node, wherein the DRX grouping configuration is based at least in part on the group assistance information, and receiving a DRX grouping configuration acceptance message based at least in part on transmitting the indication of the DRX grouping configuration.

In some aspects, the first network node comprises a first RAN node, and wherein transmitting the indication of the DRX grouping configuration comprises transmitting the indication to a second RAN node.

In some aspects, transmitting the indication comprises transmitting a RAN node interface application protocol message that includes the indication.

In some aspects, the indication of the DRX grouping configuration indicates a first DRX alignment priority level and a second DRX alignment priority level.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
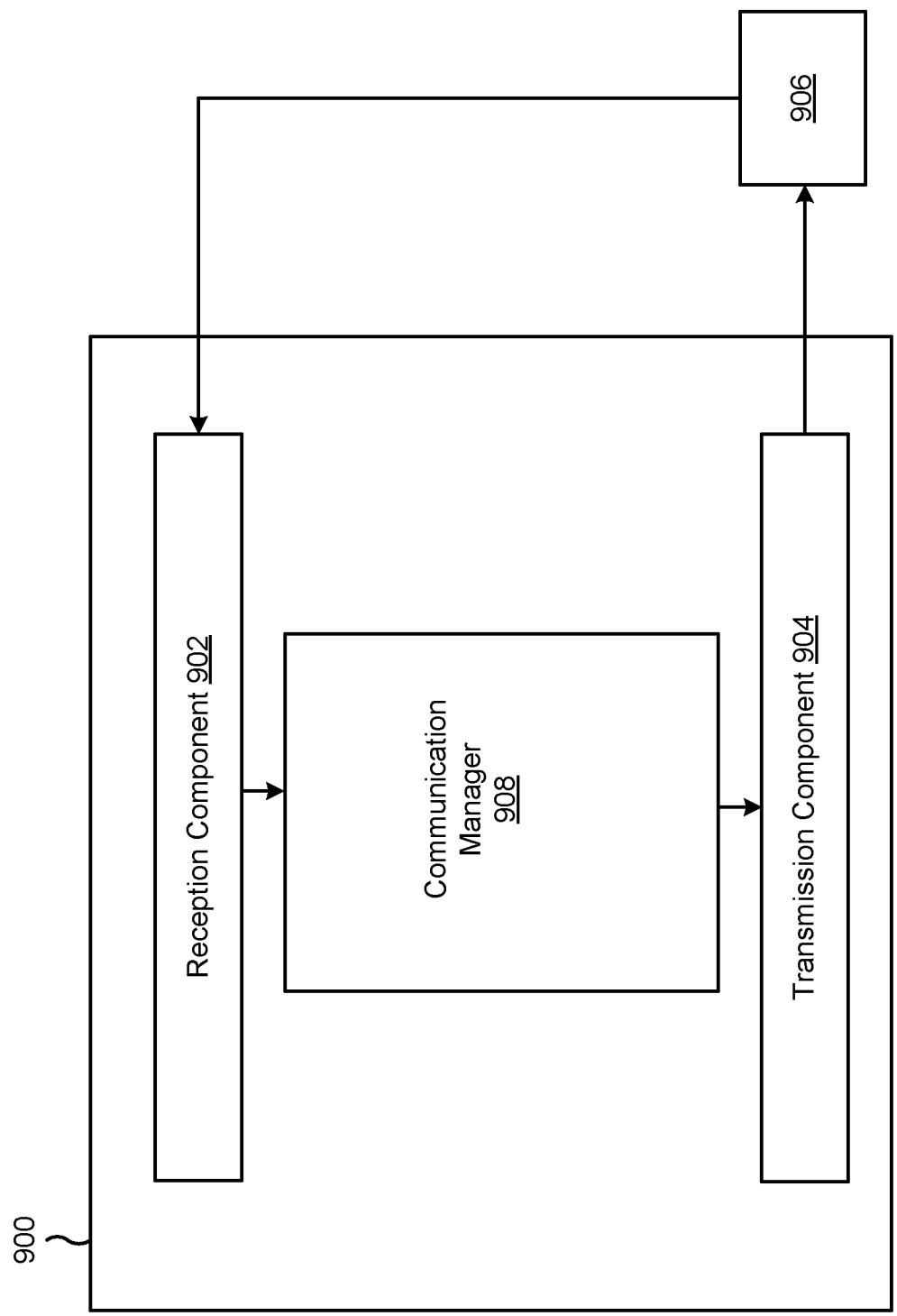
FIG. 9 is a diagram of an example apparatus for wireless communication, in accordance with the present disclosure.

FIG. 9 is a diagram of an example apparatus 900 for wireless communication. The apparatus 900 may be a network node, or a network node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 908.

In some aspects, the apparatus 900 may be configured to perform one or more operations described herein in connection with FIGS. 4 and 5. Additionally, or alternatively, the apparatus 900 may be configured to perform one or more processes described herein, such as process 600 of FIG. 6, process 700 of FIG. 7, process 800 of FIG. 8, or a combination thereof. In some aspects, the apparatus 900 and/or one or more components shown in FIG. 9 may include one or more components of the UE and/or the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE and/or the base station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE and/or the base station described in connection with FIG. 2. In some aspects, the transmission component 904 may be co-located with the reception component 902 in a transceiver.

The reception component 902 may receive DRX group information associated with a DRX grouping configuration that enables alignment of access link DRX configurations corresponding to a first set of network nodes and sidelink DRX configurations corresponding to the first set of network nodes, wherein the DRX group information indicates a first group ID corresponding to a first DRX group of a plurality of DRX groups associated with the DRX grouping configuration, wherein the first DRX group includes a first subset of the first set of network nodes.

The communication manager 908, the reception component 902, and/or the transmission component 904 may communicate, based at least in part on the DRX group information, via at least one of a sidelink or an access link. In some aspects, the communication manager 908 may include one or more antennas, a modem, a modulator, a transmit MIMO processor, a transmit processor, a controller/processor, a memory, or a combination thereof, of the UE and/or the base station described in connection with FIG. 2. In some aspects, the communication manager 908 may be, or be similar to, the communication manager 140 and/or the communication manager 150 depicted in FIGS. 1 and 2. In some aspects, the communication manager 908 may include the reception component 902 and/or the transmission component 904.

The communication manager 908 may extend an on duration of a first DRX configuration associated with the first network node so that the first DRX configuration is aligned with a second DRX configuration associated with the second network node.

The communication manager 908 may adjust, based at least in part on the first DRX alignment priority level being lower than the second DRX alignment priority level, at least one on duration of a first DRX configuration associated with the first network node so that the first DRX configuration is aligned with a second DRX configuration associated with the second network node.

The reception component 902 may receive an indication of a DRX grouping configuration that enables alignment of access link DRX configurations corresponding to a second set of network nodes and sidelink DRX configurations corresponding to the second set of network nodes. The transmission component 904 may transmit, to a second network node of the second set of network nodes, DRX group information associated with the DRX grouping configuration, wherein the DRX group information indicates a first group ID corresponding to a first DRX group of a plurality of DRX groups associated with the DRX grouping configuration, wherein the first DRX group includes a first subset of the second set of network nodes.

The transmission component 904 may transmit group assistance information that indicates at least one of a number of network nodes of the second set of network nodes that are in a connected state with the first network node or a traffic load associated with each of the network nodes of the second set of network nodes that are in the connected state with the first network node, wherein the DRX grouping configuration is based at least in part on the group assistance information.

The transmission component 904 may transmit a DRX grouping configuration acceptance message based at least in part on receiving the indication of the DRX grouping configuration.

The communication manager 908 may assign the first group ID to the second network node. The communication manager 908 may configure, based at least in part on the first DRX alignment priority level being lower than the second DRX alignment priority level, at least one adjusted on duration of a first DRX configuration associated with the second network node so that the first DRX configuration is aligned with a second DRX configuration associated with the third network node.

The reception component 902 may receive, from a second network node, of a first set of network nodes, group assistance information associated with a second set of network nodes, wherein each network node of the second set of network nodes is in a connected state with respect to the second network node. The transmission component 904 may transmit an indication of a DRX grouping configuration enabling alignment of access link DRX configurations corresponding to the second set of network nodes and sidelink DRX configurations corresponding to the second set of network nodes.

The reception component 902 may receive group assistance information that indicates at least one of a number of network nodes of the second set of network nodes that are in a connected state with the second network node or a traffic load associated with each of the network nodes of the second set of network nodes that are in the connected state with the second network node, wherein the DRX grouping configuration is based at least in part on the group assistance information. The reception component 902 may receive a DRX grouping configuration acceptance message based at least in part on transmitting the indication of the DRX grouping configuration.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a first network node, comprising: receiving discontinuous reception (DRX) group information associated with a DRX grouping configuration that enables alignment of access link DRX configurations corresponding to a first set of network nodes and sidelink DRX configurations corresponding to the first set of network nodes, wherein the DRX group information indicates a first group identifier (ID) corresponding to a first DRX group of a plurality of DRX groups associated with the DRX grouping configuration, wherein the first DRX group includes a first subset of the first set of network nodes; and communicating, based at least in part on the DRX group information, via at least one of a sidelink or an access link.

Aspect 2: The method of Aspect 1, wherein the first subset of network nodes includes the first network node, wherein each of a first set of access link DRX configurations corresponds to each network node of the first subset of the first set of network nodes, and wherein a first access link DRX configuration, of the first set of access link DRX configurations, corresponding to the first network node is aligned with each other access link DRX configuration of the first set of access link DRX configurations.

Aspect 3: The method of Aspect 2, wherein the first access link DRX configuration is not aligned with a second access link DRX configuration, of a second set of access link DRX configurations corresponding to a second subset of the first set of network nodes.

Aspect 4: The method of any of Aspects 1-3, wherein the first subset of network nodes includes the first network node, wherein each of a first set of sidelink DRX configurations corresponds to each network node of the first subset of network nodes, and wherein a first sidelink DRX configuration, of the first set of sidelink DRX configurations, corresponding to the first network node is aligned with each other sidelink DRX configuration of the first set of sidelink DRX configurations.

Aspect 5: The method of Aspect 4, wherein the first sidelink DRX configuration is not aligned with a second sidelink DRX configuration, of a second set of sidelink DRX configurations corresponding to a second subset of the first set of network nodes.

Aspect 6: The method of any of Aspects 1-5, wherein the first subset of network nodes includes the first network node, wherein each of a first set of access link DRX configurations corresponds to each network node of the first subset of the first set of network nodes, and wherein a first access link DRX configuration, of the first set of access link DRX configurations, corresponding to the first network node is aligned with each of a first set of access link DRX configurations corresponding to the first subset of the first set of network nodes.

Aspect 7: The method of Aspect 6, wherein the first access link DRX configuration is not aligned with a second sidelink DRX configuration, of a second set of sidelink DRX configurations corresponding to a second subset of the first set of network nodes.

Aspect 8: The method of any of Aspects 1-7, wherein receiving the DRX group information comprises receiving a radio resource control (RRC) message that includes a group ID information element that indicates the first group ID.

Aspect 9: The method of any of Aspects 1-8, wherein the first group ID is based at least in part on at least one of: a user equipment (UE) identity corresponding to the first network node, an existence of a sidelink connection between the first network node and a second network node of the first set of network nodes, a resource allocation mode associated with the first network node, a quality of service (QoS) requirement associated with the first network node, a DRX group status of the first DRX group, or a power consumption status associated with the first network node.

Aspect 10: The method of any of Aspects 1-9, wherein the first network node is a transmit (Tx) node, the method further comprising: receiving network node assistance information from a receive (Rx) node; and transmitting the network node assistance information to a second network node of a second set of network nodes.

Aspect 11: The method of Aspect 10, wherein the network node assistance information comprises DRX group information associated with a second DRX group of the plurality of DRX groups, wherein the second DRX group includes the Rx node.

Aspect 12: The method of Aspect 11, wherein the DRX group information indicates a second group ID corresponding to the second DRX group.

Aspect 13: The method of any of Aspects 1-12, wherein a second DRX group of the plurality of DRX groups includes a second network node of the first set of network nodes.

Aspect 14: The method of Aspect 13, wherein no DRX configuration associated with the first network node is aligned with any DRX configuration associated with the second network node.

Aspect 15: The method of either of Aspects 13 or 14, further comprising extending an on duration of a first DRX configuration associated with the first network node so that the first DRX configuration is aligned with a second DRX configuration associated with the second network node.

Aspect 16: The method of Aspect 15, wherein the first DRX configuration comprises an access link DRX configuration and wherein the second DRX configuration comprises a sidelink DRX configuration.

Aspect 17: The method of any of Aspects 13-16, wherein a first DRX configuration associated with the first network node is aligned with a second DRX configuration associated with the second network node based at least in part on a first DRX alignment priority level, corresponding to the first network node, being lower than a second DRX alignment priority level corresponding to the second network node.

Aspect 18: The method of Aspect 17, wherein the first DRX alignment priority level corresponds to the first DRX group.

Aspect 19: The method of either of Aspects 17 or 18, further comprising adjusting, based at least in part on the first DRX alignment priority level being lower than the second DRX alignment priority level, at least one on duration of a first DRX configuration associated with the first network node so that the first DRX configuration is aligned with a second DRX configuration associated with the second network node.

Aspect 20: A method of wireless communication performed by a first network node of a first set of network nodes, comprising: receiving an indication of a discontinuous reception (DRX) grouping configuration that enables alignment of access link DRX configurations corresponding to a second set of network nodes and sidelink DRX configurations corresponding to the second set of network nodes; and transmitting, to a second network node of the second set of network nodes, DRX group information associated with the DRX grouping configuration, wherein the DRX group information indicates a first group identifier (ID) corresponding to a first DRX group of a plurality of DRX groups associated with the DRX grouping configuration, wherein the first DRX group includes a first subset of the second set of network nodes.

Aspect 21: The method of Aspect 20, wherein the first subset of the second set of network nodes includes the second network node, wherein each of a first set of access link DRX configurations corresponds to each network node of the first subset of the second set of network nodes, and wherein a first access link DRX configuration, of the first set of access link DRX configurations, corresponding to the second network node is aligned with each other access link DRX configuration of the first set of access link DRX configurations.

Aspect 22: The method of Aspect 21, wherein the first access link DRX configuration is not aligned with a second access link DRX configuration, of a second set of access link DRX configurations corresponding to a second subset of the second set of network nodes.

Aspect 23: The method of any of Aspects 20-22, wherein the first subset of the second set of network nodes includes the first network node, wherein each of a first set of sidelink DRX configurations corresponds to each network node of the first subset, and wherein a first sidelink DRX configuration, of the first set of sidelink DRX configurations, corresponding to the second network node is aligned with each other sidelink DRX configuration of the first set of sidelink DRX configurations.

Aspect 24: The method of Aspect 23, wherein the first sidelink DRX configuration is not aligned with a second sidelink DRX configuration, of a second set of sidelink DRX configurations corresponding to a second subset of the second set of network nodes.

Aspect 25: The method of any of Aspects 20-24, wherein the first subset of network nodes includes the second network node, wherein each of a first set of access link DRX configurations corresponds to each network node of the first subset of the second set of network nodes, and wherein a first access link DRX configuration, of the first set of access link DRX configurations, corresponding to the second network node is aligned with each of a first set of access link DRX configurations corresponding to the first subset of the second set of network nodes.

Aspect 26: The method of Aspect 25, wherein the first access link DRX configuration is not aligned with a second sidelink DRX configuration, of a second set of sidelink DRX configurations corresponding to a second subset of the second set of network nodes.

Aspect 27: The method of any of Aspects 20-26, wherein receiving the indication of the DRX grouping configuration comprises receiving the indication of the DRX grouping configuration from a central network node.

Aspect 28: The method of any of Aspects 20-27, wherein the indication of the DRX grouping configuration indicates at least one of a number of DRX groups in the plurality of DRX groups a start time associated with each of the plurality of DRX groups or an on duration associated with each of the plurality of DRX groups.

Aspect 29: The method of any of Aspects 20-28, further comprising: transmitting group assistance information that indicates at least one of a number of network nodes of the second set of network nodes that are in a connected state with the first network node or a traffic load associated with each of the network nodes of the second set of network nodes that are in the connected state with the first network node, wherein the DRX grouping configuration is based at least in part on the group assistance information; and transmitting a DRX grouping configuration acceptance message based at least in part on receiving the indication of the DRX grouping configuration.

Aspect 30: The method of any of Aspects 20-29, wherein the first network node comprises a first radio access network (RAN) node, and wherein receiving the indication of the DRX grouping configuration comprises receiving the indication from a second RAN node.

Aspect 31: The method of Aspect 30, wherein receiving the indication comprises receiving a RAN node interface application protocol message that includes the indication.

Aspect 32: The method of any of Aspects 20-31, further comprising assigning the first group ID to the second network node.

Aspect 33: The method of any of Aspects 20-32, wherein the first group ID is based at least in part on at least one of: a user equipment (UE) identity corresponding to the second network node, an existence of a sidelink connection between the second network node and a third network node of the second set of network nodes, a resource allocation mode associated with the second network node, a quality of service (QoS) requirement associated with the second network node, a DRX group status of the first DRX group, or a power consumption status associated with the second network node.

Aspect 34: The method of Aspect 33, wherein the DRX group status comprises at least one of a number of network nodes of the second set of network nodes included in the first DRX group or a traffic load associated with the first DRX group.

Aspect 35: The method of any of Aspects 20-34, wherein transmitting the DRX group information comprises transmitting a radio resource control (RRC) message that includes a group ID information element that indicates the first group ID.

Aspect 36: The method of any of Aspects 20-35, wherein the second network node is a transmit (Tx) node, the method further comprising receiving network node assistance information from the second network node, wherein the network node assistance information is associated with at least one of the Tx node or a receive (Rx) node of the second set of network nodes.

Aspect 37: The method of Aspect 36, wherein the network node assistance information comprises DRX group information associated with a second DRX group of the plurality of DRX groups, wherein the second DRX group includes the Rx node.

Aspect 38: The method of Aspect 37, wherein the DRX group information indicates a second group ID corresponding to the second DRX group.

Aspect 39: The method of any of Aspects 20-38, wherein a second DRX group of the plurality of DRX groups includes a third network node of the second set of network nodes.

Aspect 40: The method of Aspect 39, wherein no DRX configuration associated with the second network node is aligned with any DRX configuration associated with the third network node.

Aspect 41: The method of either of Aspects 39 or 40, wherein an extended on duration of a first DRX configuration associated with the second network node is aligned with a second DRX configuration associated with the third network node.

Aspect 42: The method of Aspect 41, wherein the first DRX configuration comprises an access link DRX configuration and wherein the second DRX configuration comprises a sidelink DRX configuration.

Aspect 43: The method of any of Aspects 39-42, wherein a first DRX configuration associated with the second network node is aligned with a second DRX configuration associated with the third network node based at least in part on a first DRX alignment priority level, corresponding to the second network node, being lower than a second DRX alignment priority level corresponding to the third network node.

Aspect 44: The method of Aspect 43, wherein the first DRX alignment priority level corresponds to the first DRX group.

Aspect 45: The method of either of Aspects 43 or 44, further comprising configuring, based at least in part on the first DRX alignment priority level being lower than the second DRX alignment priority level, at least one adjusted on duration of a first DRX configuration associated with the second network node so that the first DRX configuration is aligned with a second DRX configuration associated with the third network node.

Aspect 46: The method of any of Aspects 43-45, wherein the indication of the DRX grouping configuration indicates the first DRX alignment priority level and the second DRX alignment priority level.

Aspect 47: A method of wireless communication performed by a first network node, comprising: receiving, from a second network node, of a first set of network nodes, group assistance information associated with a second set of network nodes, wherein each network node of the second set of network nodes is in a connected state with respect to the second network node; and transmitting an indication of a discontinuous reception (DRX) grouping configuration enabling alignment of access link DRX configurations corresponding to the second set of network nodes and sidelink DRX configurations corresponding to the second set of network nodes.

Aspect 48: The method of Aspect 47, wherein the first network node comprises a first base station of the first set of network nodes, and wherein the second network node comprises a second base station of the first set of network nodes.

Aspect 49: The method of either of Aspects 47 or 48, wherein the indication of the DRX grouping configuration indicates at least one of a number of DRX groups in a plurality of DRX groups, a start time associated with each of the plurality of DRX groups, or an on duration associated with each of the plurality of DRX groups.

Aspect 50: The method of any of Aspects 47-49, further comprising: receiving group assistance information that indicates at least one of a number of network nodes of the second set of network nodes that are in a connected state with the second network node or a traffic load associated with each of the network nodes of the second set of network nodes that are in the connected state with the second network node, wherein the DRX grouping configuration is based at least in part on the group assistance information; and receiving a DRX grouping configuration acceptance message based at least in part on transmitting the indication of the DRX grouping configuration.

Aspect 51: The method of any of Aspects 47-50, wherein the first network node comprises a first radio access network (RAN) node, and wherein transmitting the indication of the DRX grouping configuration comprises transmitting the indication to a second RAN node.

Aspect 52: The method of Aspect 51, wherein transmitting the indication comprises transmitting a RAN node interface application protocol message that includes the indication.

Aspect 53: The method of any of Aspects 47-52, wherein the indication of the DRX grouping configuration indicates a first DRX alignment priority level and a second DRX alignment priority level.

Aspect 54: An apparatus for wireless communication at a device, comprising a processor; memory coupled with the processor; and instructions stored in the memory and executable by the processor to cause the apparatus to perform the method of one or more of Aspects 1-19.

Aspect 55: A device for wireless communication, comprising a memory and one or more processors coupled to the memory, the one or more processors configured to perform the method of one or more of Aspects 1-19.

Aspect 56: An apparatus for wireless communication, comprising at least one means for performing the method of one or more of Aspects 1-19.

Aspect 57: A non-transitory computer-readable medium storing code for wireless communication, the code comprising instructions executable by a processor to perform the method of one or more of Aspects 1-19.

Aspect 58: A non-transitory computer-readable medium storing a set of instructions for wireless communication, the set of instructions comprising one or more instructions that, when executed by one or more processors of a device, cause the device to perform the method of one or more of Aspects 1-19.

Aspect 59: An apparatus for wireless communication at a device, comprising a processor; memory coupled with the processor; and instructions stored in the memory and executable by the processor to cause the apparatus to perform the method of one or more of Aspects 20-46.

Aspect 60: A device for wireless communication, comprising a memory and one or more processors coupled to the memory, the one or more processors configured to perform the method of one or more of Aspects 20-46.

Aspect 61: An apparatus for wireless communication, comprising at least one means for performing the method of one or more of Aspects 20-46.

Aspect 62: A non-transitory computer-readable medium storing code for wireless communication, the code comprising instructions executable by a processor to perform the method of one or more of Aspects 20-46.

Aspect 63: A non-transitory computer-readable medium storing a set of instructions for wireless communication, the set of instructions comprising one or more instructions that, when executed by one or more processors of a device, cause the device to perform the method of one or more of Aspects 20-46.

Aspect 64: An apparatus for wireless communication at a device, comprising a processor; memory coupled with the processor; and instructions stored in the memory and executable by the processor to cause the apparatus to perform the method of one or more of Aspects 47-53.

Aspect 65: A device for wireless communication, comprising a memory and one or more processors coupled to the memory, the one or more processors configured to perform the method of one or more of Aspects 47-53.

Aspect 66: An apparatus for wireless communication, comprising at least one means for performing the method of one or more of Aspects 47-53.

Aspect 67: A non-transitory computer-readable medium storing code for wireless communication, the code comprising instructions executable by a processor to perform the method of one or more of Aspects 47-53.

Aspect 68: A non-transitory computer-readable medium storing a set of instructions for wireless communication, the set of instructions comprising one or more instructions that, when executed by one or more processors of a device, cause the device to perform the method of one or more of Aspects 47-53.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first network node, comprising:
   receiving discontinuous reception (DRX) group information associated with a DRX grouping configuration that enables alignment of access link DRX configurations corresponding to a first set of network nodes and sidelink DRX configurations corresponding to the first set of network nodes, wherein the DRX group information indicates a first group identifier (ID) corresponding to a first DRX group of a plurality of DRX groups associated with the DRX grouping configuration, wherein the first DRX group includes a first subset of the first set of network nodes; and
   communicating, based at least in part on the DRX group information, via at least one of a sidelink or an access link.

2. The method of claim 1, wherein the first subset of network nodes includes the first network node, wherein each of a first set of access link DRX configurations corresponds to each network node of the first subset of the first set of network nodes, and wherein a first access link DRX configuration, of the first set of access link DRX configurations, corresponding to the first network node is aligned with each other access link DRX configuration of the first set of access link DRX configurations.

3. The method of claim 2, wherein the first access link DRX configuration is not aligned with a second access link DRX configuration, of a second set of access link DRX configurations corresponding to a second subset of the first set of network nodes.

4. The method of claim 1, wherein the first subset of network nodes includes the first network node, wherein each of a first set of sidelink DRX configurations corresponds to each network node of the first subset of network nodes, and wherein a first sidelink DRX configuration, of the first set of sidelink DRX configurations, corresponding to the first network node is aligned with each other sidelink DRX configuration of the first set of sidelink DRX configurations.

5. The method of claim 4, wherein the first sidelink DRX configuration is not aligned with a second sidelink DRX configuration, of a second set of sidelink DRX configurations corresponding to a second subset of the first set of network nodes.

6. The method of claim 1, wherein the first subset of network nodes includes the first network node, wherein each of a first set of access link DRX configurations corresponds to each network node of the first subset of the first set of network nodes, and wherein a first access link DRX configuration, of the first set of access link DRX configurations, corresponding to the first network node is aligned with each of a first set of access link DRX configurations corresponding to the first subset of the first set of network nodes.

7. The method of claim 6, wherein the first access link DRX configuration is not aligned with a second sidelink DRX configuration, of a second set of sidelink DRX configurations corresponding to a second subset of the first set of network nodes.

8. The method of claim 1, wherein receiving the DRX group information comprises receiving a radio resource control (RRC) message that includes a group ID information element that indicates the first group ID.

9. The method of claim 1, wherein the first group ID is based at least in part on at least one of:
   a user equipment (UE) identity corresponding to the first network node,
   an existence of a sidelink connection between the first network node and a second network node of the first set of network nodes,
   a resource allocation mode associated with the first network node,
   a quality of service (QoS) requirement associated with the first network node,
   a DRX group status of the first DRX group, or
   a power consumption status associated with the first network node.

10. The method of claim 1, wherein the first network node is a transmit (Tx) node, the method further comprising:
    receiving network node assistance information from a receive (Rx) node; and
    transmitting the network node assistance information to a second network node of a second set of network nodes.

11. The method of claim 10, wherein the network node assistance information comprises DRX group information associated with a second DRX group of the plurality of DRX groups, wherein the second DRX group includes the Rx node.

12. The method of claim 11, wherein the DRX group information indicates a second group ID corresponding to the second DRX group.

13. The method of claim 1, wherein a second DRX group of the plurality of DRX groups includes a second network node of the first set of network nodes.

14. The method of claim 13, wherein no DRX configuration associated with the first network node is aligned with any DRX configuration associated with the second network node.

15. The method of claim 13, further comprising extending an on duration of a first DRX configuration associated with the first network node so that the first DRX configuration is aligned with a second DRX configuration associated with the second network node.

16. The method of claim 15, wherein the first DRX configuration comprises an access link DRX configuration and wherein the second DRX configuration comprises a sidelink DRX configuration.

17. The method of claim 13, wherein a first DRX configuration associated with the first network node is aligned with a second DRX configuration associated with the second network node based at least in part on a first DRX alignment priority level, corresponding to the first network node, being lower than a second DRX alignment priority level corresponding to the second network node.

18. The method of claim 17, wherein the first DRX alignment priority level corresponds to the first DRX group.

19. The method of claim 17, further comprising adjusting, based at least in part on the first DRX alignment priority level being lower than the second DRX alignment priority level, at least one on duration of a first DRX configuration associated with the first network node so that the first DRX configuration is aligned with a second DRX configuration associated with the second network node.

20. A method of wireless communication performed by a first network node of a first set of network nodes, comprising:
    receiving an indication of a discontinuous reception (DRX) grouping configuration that enables alignment of access link DRX configurations corresponding to a second set of network nodes and sidelink DRX configurations corresponding to the second set of network nodes; and
    transmitting, to a second network node of the second set of network nodes, DRX group information associated with the DRX grouping configuration, wherein the DRX group information indicates a first group identifier (ID) corresponding to a first DRX group of a plurality of DRX groups associated with the DRX grouping configuration, wherein the first DRX group includes a first subset of the second set of network nodes.

21. The method of claim 20, wherein receiving the indication of the DRX grouping configuration comprises receiving the indication of the DRX grouping configuration from a central network node.

22. The method of claim 20, further comprising:
    transmitting group assistance information that indicates at least one of a number of network nodes of the second set of network nodes that are in a connected state with the first network node or a traffic load associated with each of the network nodes of the second set of network nodes that are in the connected state with the first network node, wherein the DRX grouping configuration is based at least in part on the group assistance information; and
    transmitting a DRX grouping configuration acceptance message based at least in part on receiving the indication of the DRX grouping configuration.

23. The method of claim 20, wherein the first network node comprises a first radio access network (RAN) node, wherein receiving the indication of the DRX grouping configuration comprises receiving the indication from a second RAN node, and wherein receiving the indication comprises receiving a RAN node interface application protocol message that includes the indication.

24. A method of wireless communication performed by a first network node, comprising:
    receiving, from a second network node, of a first set of network nodes, group assistance information associated with a second set of network nodes, wherein each network node of the second set of network nodes is in a connected state with respect to the second network node; and
    transmitting an indication of a discontinuous reception (DRX) grouping configuration enabling alignment of access link DRX configurations corresponding to the second set of network nodes and sidelink DRX configurations corresponding to the second set of network nodes.

25. The method of claim 24, further comprising:
    receiving group assistance information that indicates at least one of a number of network nodes of the second set of network nodes that are in a connected state with the second network node or a traffic load associated with each of the network nodes of the second set of network nodes that are in the connected state with the second network node, wherein the DRX grouping configuration is based at least in part on the group assistance information; and receiving a DRX grouping configuration acceptance message based at least in part on transmitting the indication of the DRX grouping configuration.

26. The method of claim 24, wherein the first network node comprises a first radio access network (RAN) node, wherein transmitting the indication of the DRX grouping configuration comprises transmitting the indication to a second RAN node, and wherein transmitting the indication comprises transmitting a RAN node interface application protocol message that includes the indication.

27. A first network node for wireless communication, comprising:
a memory; and
one or more processors, coupled to the memory, configured to:
receive discontinuous reception (DRX) group information associated with a DRX grouping configuration that enables alignment of access link DRX configurations corresponding to a first set of network nodes and sidelink DRX configurations corresponding to the first set of network nodes, wherein the DRX group information indicates a first group identifier (ID) corresponding to a first DRX group of a plurality of DRX groups associated with the DRX grouping configuration, wherein the first DRX group includes a first subset of the first set of network nodes; and
communicate, based at least in part on the DRX group information, via at least one of a sidelink or an access link.

28. The first network node of claim 27, wherein the one or more processors, to receive the DRX group information, are configured to receive a radio resource control (RRC) message that includes a group ID information element that indicates the first group ID.

29. The first network node of claim 27, wherein the first group ID is based at least in part on at least one of:
a user equipment (UE) identity corresponding to the first network node,
an existence of a sidelink connection between the first network node and a second network node of the first set of network nodes,
a resource allocation mode associated with the first network node,
a quality of service (QoS) requirement associated with the first network node,
a DRX group status of the first DRX group, or
a power consumption status associated with the first network node.

30. The first network node of claim 27, wherein the first network node is a transmit (Tx) node, and wherein the one or more processors is further configured to:
receive network node assistance information from a receive (Rx) node; and
transmit the network node assistance information to a second network node of a second set of network nodes.

* * * * *